May 7, 1968   H. A. KNOLL   3,382,025
ANOMALOSCOPE FOR TESTING COLOR VISION
Filed March 10, 1967   3 Sheets-Sheet 1

HENRY A. KNOLL
INVENTOR.

BY Frank C. Parker

ATTORNEY

May 7, 1968  H. A. KNOLL  3,382,025

ANOMALOSCOPE FOR TESTING COLOR VISION

Filed March 10, 1967  3 Sheets-Sheet 2

HENRY A. KNOLL
INVENTOR.

BY Frank C. Parker

ATTORNEY

May 7, 1968 H. A. KNOLL 3,382,025
ANOMALOSCOPE FOR TESTING COLOR VISION
Filed March 10, 1967 3 Sheets-Sheet 3

HENRY A. KNOLL
INVENTOR.

BY *Frank C. Parker*

ATTORNEY

United States Patent Office 3,382,025
Patented May 7, 1968

3,382,025
ANOMALOSCOPE FOR TESTING COLOR VISION
Henry A. Knoll, Penfield, N.Y., assignor to Bausch &
Lomb Incorporated, Rochester, N.Y., a corporation
of New York
Continuation-in-part of application Ser. No. 312,624,
Sept. 30, 1963. This application Mar. 10, 1967, Ser.
No. 622,176
2 Claims. (Cl. 351—17)

ABSTRACT OF THE DISCLOSURE

An anomaloscope for testing color vision defects of the human eye by the use of a sequence of color filters which provide a quantitative evaluation of protanomaly and deuteranomaly. The neutral point determinations may also be made to establish a differential diagnosis of protanopia and deuteranopia.

Cross reference to related applications

The present application is a continuation-in-part of original patent application S.N. 312,624, Sept. 30, 1963, of the same inventor, now abandoned.

Background of the invention

The present invention relates to an anomaloscope for testing and measuring color response and anomalies of the human eye and more particularly it relates to a multicolor filter type of anomaloscope.

Generally a person's color vision defect may have its origin in genetic defects, retinal pathology or toxic poisoning. Generally those defects associated with toxic poisoning are rarely encountered. However, those defects associated with genetic defects and retinal pathology are the subjects of increased interests. Congenital defects are the most common, and afflict approximately 8 percent of all males and 0.5 percent of all females. The defects associated with retinal pathology occur mainly in older persons and have recently received increased attention.

The interest in color vision defects have stimulated numerous endeavors to provide suitable test apparatus for testing and measuring individual differences in color vision and color blindness. For example, there are presently three major approaches to testing for color defects. They are: low color discrimination-hue tests, confusions-pseudoisochromatic plates, and color mixture-anomaloscope. The pseudoisochromatic plates have been widely accepted in view of their relatively low cost and ease of administration. The hue test is slightly more expensive and requires substantially more time to administer and score. Anomaloscopes have been available but because of their relatively high cost have not been widely accepted for clinical use.

In response to an increased interest expressed by certain color vision authorities there has been an attempt to provide a relatively inexpensive filter type anomaloscope. An example of this approach is shown in the article "The Pickford-Nicholson Anomaloscope for Testing and Measuring Color Sensitivity and Colour Blindness, and Other Tests and Experiments" by R. W. Pickford and R. Lakowski which appeared in the British Journal, Physiol. Optics, vol. 17, pp. 131–150 (1960). An instrument according to the prevent invention is directed along similar lines to the device disclosed in the aforementioned article.

Summary of the invention

Advantageously an anomaloscope according to the present invention is relatively inexpensive and yet facilitates adequate testing procedures. It is presently thought that the ease of administering tests and speed in evaluating the results with an instrument of this type make the device commercially competitive with the pseudo-isochromatic plates. Furthermore the device includes means for eliminating a visual afterimage produced by colored light which may also be used in advance of the first color exposure. The elimination means may be used to dispel any after effect produced by previous color exposure to or during the test.

It is presently thought that the devices according to the present invention will have many commercial applications. For example, schools could advantageously utilize these devices in screening students for vocational guidance. That is, students having color defects could be advised at an early age not to pursue professions which require color perception beyond their capabilities. The devices are also applicable for industrial use in screening applications. Governmental agencies and insurance companies have a similar need for such devices. Still further applications lie in the field of psychological testing.

Briefly, an anomalscope according to the present invention comprises a plurality of chambers defined by a plurality of common walls disposed within an outer housing. A light source and cooling means for dissipating the heat generated by the light source are disposed in a first one of the chambers. A second chamber has a light source disposed therein which is of relatively less intensity than the first mentioned light source. A diffusion plate separates the second chamber from the outside of the housing and is illuminated by the light source disposed within the second chamber for providing diffuse illumination. A third and a fourth chamber are disposed adjacent the first chamber. Each of the third and fourth chambers have an aperture connecting the third and fourth chambers respectively with the first chamber and allowing the light from the relatively bright light source to be directed into the third and fourth chambers. A filter is disposed over each of the openings for modifying the spectral characteristics of the light which passes into the third and fourth chambers. These filters are each divided into two portions, so that movement of the filters modifies the spectral characteristics of the light. For example, one filter is divided into a green portion and a red portion whereby the spectral characteristics of the light which illuminates the chamber is modified by changing the ratio of red to green over the aperture. The second filter is divided into a yellow portion and an opaque portion and the intensity of the light which illuminates the fourth chamber is changed by varying the ratio of yellow to opaque over the aperture. A relatively small aperture which is small with respect to the diffusion plate is located in one wall of the housing. The aperture opens into the third and fourth chambers and includes a translucent screen in the rear portion thereof, whereby an observer can look through the aperture at the screen which is illuminated by the light from the two chambers.

The invention will now be described in more detail in connection with the accompanying drawings.

*Description of the preferred embodiment*

Figure 2:
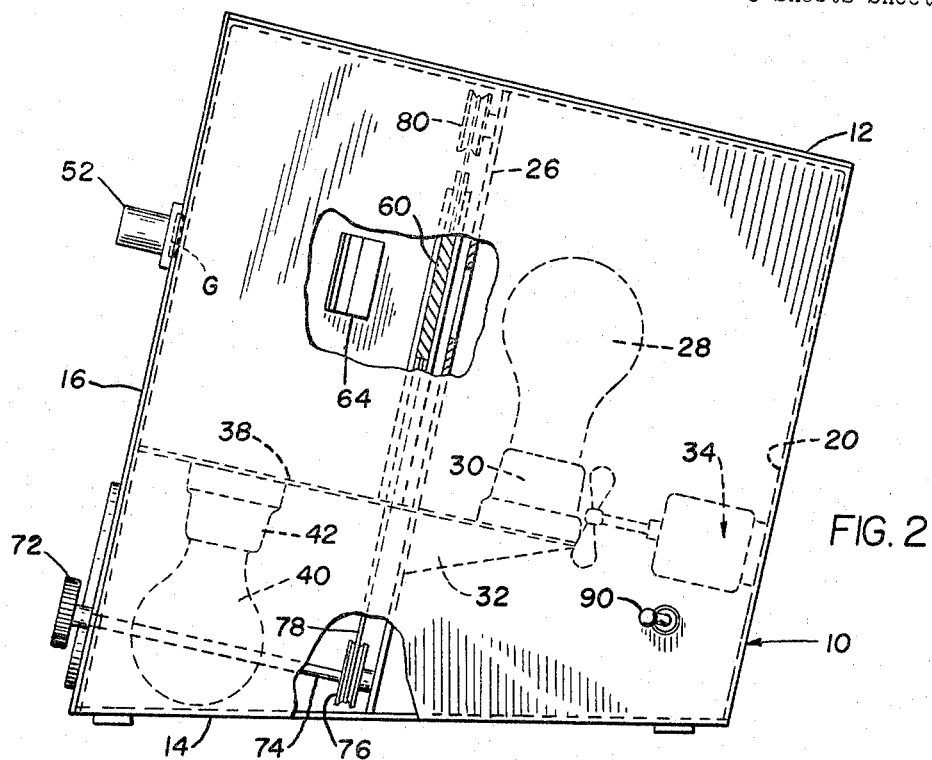
FIG. 2 is a side elevational view of an anomaloscope shown in FIG. 1.
Figure 1:
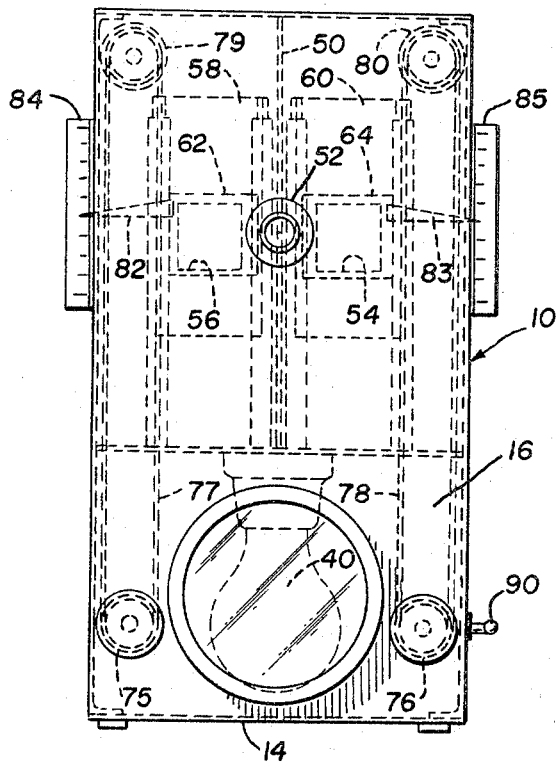
FIG. 1 is a front elevational view of an anomaloscope according to the present invention.
Figure 3:
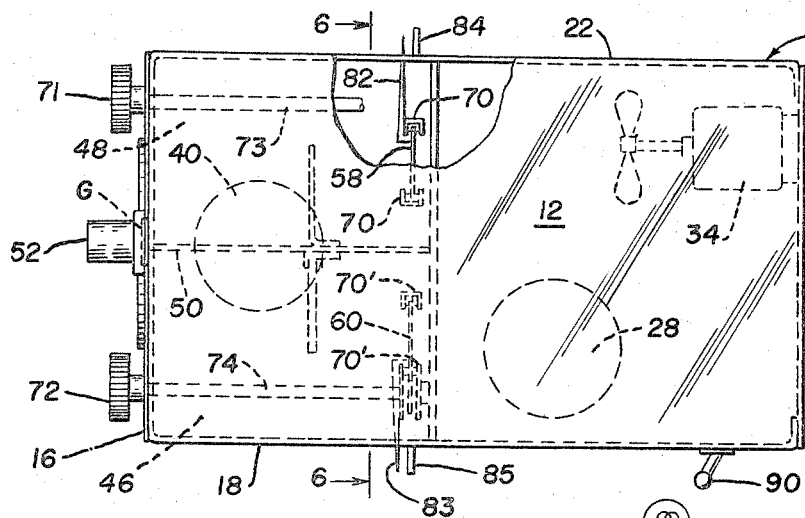
FIG. 3 is a top plan view of the device shown in FIGS. 1 and 2.

Referring now particularly to the drawings, like reference numerals have been used throughout FIGURES 1–8 to designate similar parts. The anomaloscope shown in the figures comprises a generally box-shaped housing 10 which includes a top plate 12, bottom plate 14 and four sides 16, 18, 20 and 22. The side wall 16 is shown as the front wall or front of the device while the side 20 makes up the rear surface of the housing 10.

A first chamber 24 is located in the rear portion of the housing 10 and is defined by the side walls 18, 20, 22 and a common wall 26 which separates the front and rear portion of the housing 10. In the presently preferred form of the invention the wall 26 extends from the top 12 to the bottom 14 of the housing 10. A light bulb 28 is received within a socket assembly 30 which is mounted on a bracket 32. The bracket 32 is fixed to the wall 26. A fan 34 is also disposed within the chamber 24 and is fixed to the wall 20. As illustrated the fan 24 is disposed in the lower rear portion of the chamber 24 and is effective to dissipate the heat generated by the bulb 28.

A second chamber 36 is disposed in the lower forward portion of the housing 10 and is defined by the side walls 16, 18, 22 and the common wall 26. A second common wall 38 forms the top of the chamber 36 while the bottom 14 of the housing 10 forms the base of the chamber 36. A light bulb 40 is received within the socket 42 which is mounted on the common wall 38. An aperture 44 is formed in the lower portion of the front wall 16 and is covered by a diffusion plate. An observer viewing the diffusion plate will therefore see a source of white light which will eliminate any visual afterimage produced by colored light.

A third chamber 46 and fourth chamber 48 are disposed in the upper forward portion of the housing 10. The third chamber is defined by the side walls 16 and 18 as well as the common wall 26 and a third common wall 50. The fourth chamber 48 is defined by the common wall 26, side walls 16, 22, and the common wall 50. The base of the chambers 46 and 48 are formed by the common wall 38 while the top of each of these chambers is formed by the top 12 of the housing 10. A viewing tube 52 is disposed in an upper portion of the front wall 16 and defines an opening in the wall 16 which extends into the chambers 46 and 48. The viewing tube 52 or aperture includes a transluscent screen G in the rear portion thereof and is bisected by the common wall 50 so that an observer looking through the viewing tube can simultaneously view the light from the chambers 46 and 48 which illuminates the screen G.

The common wall 26 includes a pair of apertures 54 and 56 which connect the first chamber 24 with the chambers 46 and 48 respectively. The apertures 54 and 56 are covered by a pair of filter plates 58 and 60 which are adapted to modify the spectral characteristics of light passing therethrough from the light source 28 and into the chambers 46 and 48. A pair of light baffles 62 and 64 are fixed to the wall 50 and separate the apertures 54 and 56 from the viewing tube 52. The light baffle 62 for example, extends inwardly into the chamber 48 while the light baffle 64 extends inwardly into the chamber 46. In the presently preferred embodiment, the light baffle 62 is a sheet of metal while the baffle 64 is made of transluscent glass whereby the right side of the field of view which is illuminated by the relatively weak yellow filter is compensated to more nearly match the left side thereof. This preferred form has been found desirable when used in conjunction with particular filters which will be discussed hereinafter.

Figure 6:
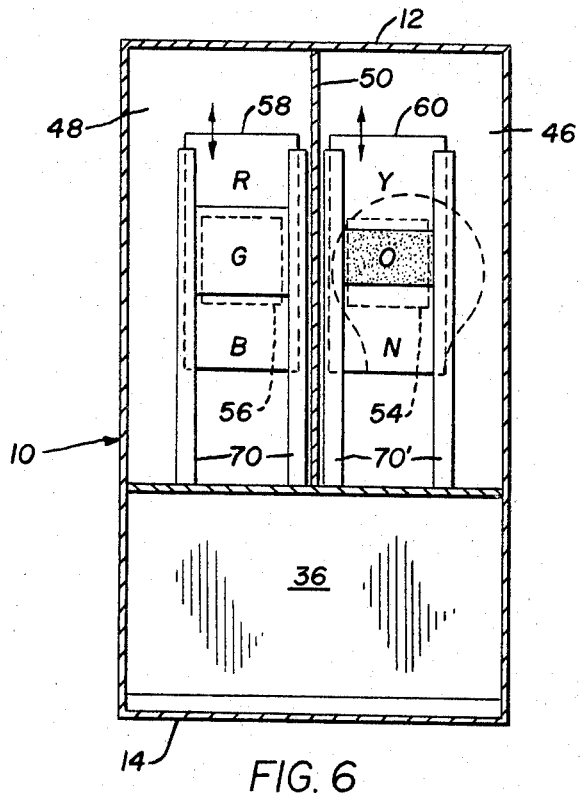
FIG. 6 is a cross-sectional view taken on the line 6—6 of FIG. 3.
Figure 7:
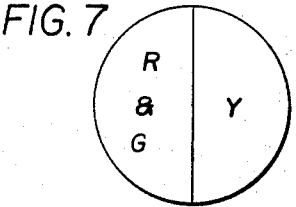
FIG. 7 is a schematic view of the field which is seen through the viewing tube when the instrument is in one condition of operation.

As best shown in FIG. 6, the filter plates 58 and 60 are rectangularly shaped and have Wratten color filters formed thereon in adjacent areas, the plates being movably mounted for selective exposure of said areas in front of the apertures 54 and 56 so that the transmitted light has suitable spectral characteristics. Preferably the filter plates 58 and 60 are composed of two glass plates between which the specified sheet filter material is pressed, the plates being held together for instance by binding tape which is applied around the periphery of the plates or otherwise. The filter plates 58 and 60 are fitted within elongated brackets or rails 70, 70' which are fixed to the wall 26 so that said slides may be moved vertically as indicated by the double ended arrows appearing in FIG. 6.

The filter plate 58 in light chamber 48 is composed of an uppermost red filter area indicated by letter R in FIG. 6 and contiguously below is formed a green filter area indicated by letter G. In lowermost position is formed a blue filter area indicated by letter B contiguously to the green area G. The companion filter plate 60 in light chamber 46 is composed on an uppermost yellow filter area indicated by letter Y.

Below the yellow filter Y is formed a neutral filter N having an area comparable to area Y and separated therefrom by an opaque area O as shown in FIG. 6.

Preferably the dominant wavelength λ of light transmitted by the filter areas are as follows, the values given being obtained either by single commercially obtainable filters or by a combination of such filters.

|   | Mμ |
|---|-----|
| R | 605 |
| G | 550 |
| B | 457 |
| Y | 575 |

The movement of the filters is controlled by a pair of knobs 71, 72 which are connected via a pair of shafts 73, 74 to a pair of lower pulleys 75, 76. Wires 77, 78 extend around the lower pulleys 75, 76 and over a pair of upper pulleys 79, 80 and are connected to the upper and lower portion of the filters respectively. Turning the knob 71 clockwise lowers the filter 58 while turning in a counterclockwise direction raises the filter 58 on a vertical axis. Rotation of the knob 72 in a clockwise direction raises the filter 60 while rotation in the counterclockwise direction lowers it. A pair of pointers 82, 83 are fixed to the filters 58 and 60 in any suitable manner and extend outwardly through a pair of slots in the side walls 18 and 22. Scales 84, 85 are fixed to the walls adjacent the slots so that the position of the filter is indicated by a pointer's position with respect to the scale.

Figure 5:
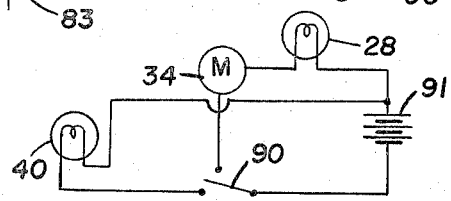
FIG. 5 is a schematic diagram of an electrical circuit used in the anomaloscope shown in the above-mentioned figures.
Figure 4:
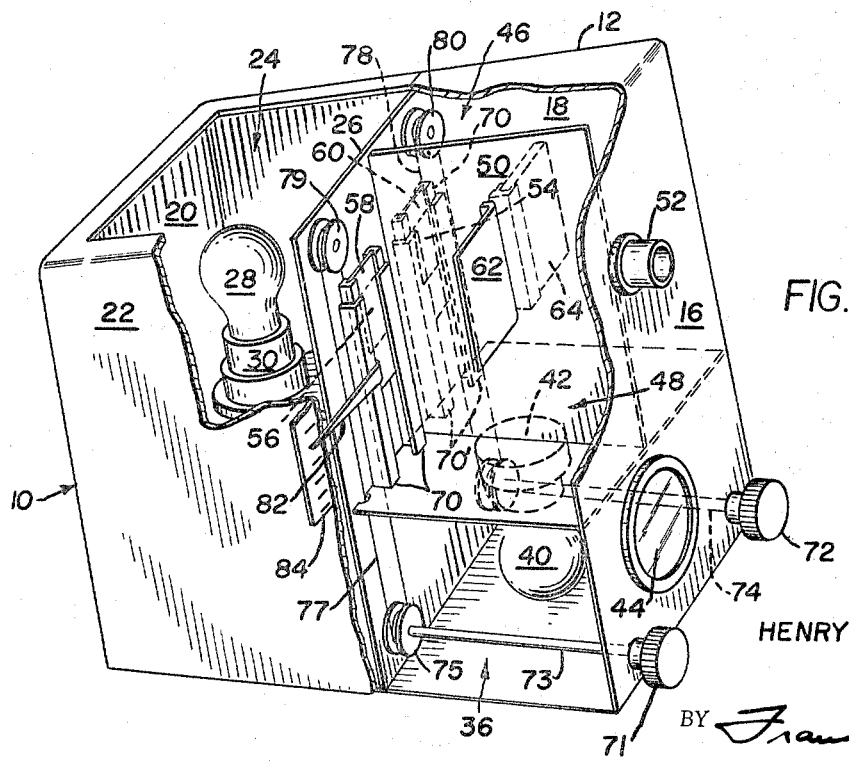
FIG. 4 is a perspective view of the anomaloscope shown in FIGS. 1–3.

A schematic diagram of an electrical circuit is shown in FIG. 5. As illustrated, the bulb 28 and fan 34 are connected in series with a switch 90 and a source of power 91. Closing the switch energizes the light 28 and the fan 34. The second light 40 is also connected to the power suply 91 through the switch 90 and is energized when the switch 90 is in a second operative position not shown. The fan 34 is operative at the same time as is the bulb 28 in order to dissipate the heat generated from the relatively large light source 28.

Typically the color anomaly test is conducted in the following manner by the use of the above described anomaloscope.

The anomalscope 10 is placed on a table and plugged into a power outlet, the elevation of the instrument being adjusted to place the viewing tube 52 about at eye level when the patient is seated. Sitting at about arm's length from the instrument, the patient views the test field through the tube 52.

The red-green vs. yellow test procedure comprises the numbered steps mentioned herebelow.

(1) Occlude the patient's left eye.

(2) Turn on switch 90 to energize lamp 40 which illuminates the adapting field 44 with white light, the period of observation of field 44 being about 2 min.

(3) Turn on switch 90 to energize the test field lamp 28 so as to illuminate the test field and extinguish the adapter lamp 40. The patient observes both left and right portions of the test field through tube 52, the left portion having the contiguous red and blue filters formed on slide 58, and right portion having the yellow filter formed on slide 60. Then knob 72 is rotated until the color intensities seen in both portions of the field are balanced.

(4) If the patient experiences difficulty in matching colors on both parts of the test field, steps (2) and (3) may be repeated.

(5) The settings of the indicators 82 and 83 on scales 84 and 85 are noted.

(6) Occluder is shifted to the patient's other eye and subsequently steps (1) to (4) are repeated.

Figure 8:
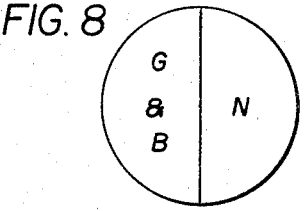
FIG. 8 is a view similar to FIG. 7 when the instrument is in another condition of operation.

Also comprised in said test procedure is the determination of the neutral point, said point for protanopes being located at 493 m$\mu$ and for deuteranopes being located at 497 m$\mu$. As indicated in FIG. 8, the green-blue mixed light as seen in the left of the aperture 52 is matched against the neutral intensity light as seen in the right side of said aperture. As aforementioned, the left and right sides of the field of the sight aperture 52 are balanced by manipulations of front knobs 71 and 72. The above described neutral point test is often used as a supplement to the aforementioned red-green vs. yellow test.

Although only a preferred form of said anomaloscope and corresponding test procdure has been shown and described in detail, other forms are possible and changes may be made in the form and arrangement of its parts and in the details thereof without departing from the spirit of the invention as defined in the claims herebelow.

I claim:

1. An anomlaoscope comprising:
an outer housing,
means including a plurality of common walls defining four chambers within said housing,
a light source and cooling means disposed within a first one of said chambers,
a second of said chambers disposed adjacent said first chamber and separated therefrom by one of said common walls,
a second light source adapted to provide a relatively small amount of illumination with respect to the illumination provided by the first light source disposed within said second chamber,
a third and a fourth of said chambers, each disposed adjacent said first and said second chambers and separated from said first and said second chambers by a pair of adjacent common walls,
means including a common wall separating said third and said fourth chambers from each other,
means defining a viewing aperture in a front wall of said housing, and said common wall separating said third and fourth chambers also dividing said aperture into two openings of approximately equal areas leading into said third and fourth chambers respectively,
means defining a second aperture in the front wall of said housing which opens into said second chamber whereby light from said second light source can be observed by a viewer,
means defining a pair of openings in said common wall separating said third and fourth chambers from said first chamber, one of said pair of openings connecting said third and said first chambers and the other of said openings connecting said fourth chamber and said first chamber,
a pair of light filters disposed respectively over said pair of openings,
the light filter covering one of said pair of openings being partly red and partly green and being moveable to vary the ratio of exposure of the red and green areas, and the filter covering the other of said openings being yellow and being partly occludable to vary the intensity thereof,
a tubular member disposed adjacent to said viewing aperture and extending outwardly therefrom to thereby form a bisected viewing tube which is bisected by said fourth common wall, said viewing tube including a translucent screen disposed therein, and
a pair of light baffles, one of said baffles being totally opaque and being disposed in said third chamber between the openings therein so as to occlude the red-green filter and the second of said baffles being translucent and being disposed in said fourth chamber between the openings therein so as to partially occlude said yellow filter whereby the light passing through said filters is not directly visible from said viewing tube and the light passing through the relatively weak yellow filter being compensated to balance in intensity the light passing through the red-green filter.

2. An anomaloscope comprising an outer housing, means including a plurality of common walls defining four chambers within said housing, a light source and cooling means disposed within a first one of said chambers, a second of said chambers disposed adjacent said first chamber and separated therefrom by one of said common walls, a second light source adapted to provide a relatively small amount of illumination with respect to the illumination provided by the first light source disposed within said second chamber, a third and a fourth of said chambers each disposed adjacent said first and said second chambers and separated from said first and said second chambers by a pair of adjacent common walls, means including a common wall separating said third and said fourth chambers from each other, means defining a viewing aperture in a front wall of said housing, said common wall separating said third and fourth chambers also dividing said aperture into two openings of approximately equal areas leading into said third and fourth chambers respectively, means defining a second aperture in the front wall of said housing which opens into said second chamber whereby light from said second light source can be observed by a viewer, means defining a pair of openings in said common wall separating said third and fourth chambers from said first chamber, one of said pair of openings connecting said third and said first chambers and the other of said openings connecting said fourth chambers and said first chamber,
and a pair of filter plates covering individually said pair of openings and mounted for vertical motion along the wall in which the openings are formed,
means for slidably mounting each of said filter plates for said vertical movement on said common wall,
a red filter portion designated R formed at the top of one of said plates,
a green filter portion designated G formed on said slide adjacent to the lower edge of said red portion,
a blue filter portion designated B formed adjacent to the lower edge of said green portion,
a yellow filter portion designated Y formed on the upper part of the other of said pair of filter plates, and a neutral portion designated N formed on the lower part of said other filter plate and an opaque area formed on the plate between areas Y and N, the dominant wavelength λ of light transmitted by the filter areas R, G, B, and Y are given substantially in the table herebelow

|   | Mμ |
|---|---|
| R | 605 |
| G | 550 |
| B | 457 |
| Y | 575 | whereby the spectral characteristics of the light from said first light source passing through said filters and into said third and fourth chambers may be altered by moving said filters.

References Cited

UNITED STATES PATENTS

| 1,880,026 | 9/1932 | Singerman | 351—1 X |
| 2,186,408 | 1/1940 | Feldman | 351—17 |
| 2,425,821 | 8/1947 | Newton | 351—28 |
| 2,528,513 | 11/1950 | Grether. | |

OTHER REFERENCES

Pickford et al.: The Pickford-Nicholson Anomaloscope. Article in British Journal of Physiological Optics, vol. 17, 1960, pp. 131–140 cited. Photocopy in 331/35.

DAVID H. RUBIN, *Primary Examiner.*